United States Patent [19]

Auguste

[11] Patent Number: 4,783,165

[45] Date of Patent: Nov. 8, 1988

[54] RAPID START-UP CAMERA

[75] Inventor: Robert Auguste, Point Arena, Calif.

[73] Assignee: Showscan Film Corporation, Culver City, Calif.

[21] Appl. No.: 14,309

[22] Filed: Feb. 13, 1987

[51] Int. Cl.$^4$ ............................................. G03B 21/48
[52] U.S. Cl. ..................................... 352/180; 352/14; 352/174
[58] Field of Search .................. 352/14, 174, 180; 242/186, 190, 206, 207, 208

[56] References Cited

U.S. PATENT DOCUMENTS

| | | | |
|---|---|---|---|
| 2,771,814 | 11/1956 | Isom | 352/174 |
| 3,244,469 | 4/1966 | Hennessey et al. | 352/14 |
| 4,312,576 | 1/1982 | DeJeney | 352/14 |

Primary Examiner—Monroe H. Hayes
Attorney, Agent, or Firm—Freilich, Hornbaker, Rosen & Fernandez

[57] ABSTRACT

A motion picture camera is described which minimizes waste of film during the start up of the camera, when the supply and takeup reels are rapidly accelerated until film is moving at the proper speed, at which time the camera begins to take pictures. A reel motor is energized to apply a high torque that rapidly accelerates the takeup reel at an acceleration limited by the amount of film on the takeup reel, while the camera motor which moves film through the film gate region is controlled to move film towards the takeup reel at a speed that maintains a moderate level of film tension between the film gate region and the takeup reel.

2 Claims, 1 Drawing Sheet

RAPID START-UP CAMERA

BACKGROUND OF THE INVENTION

Each time a motion picture camera is started, film is wasted during the period of a few seconds during which the film (and the reels) is accelerated to full speed. For a 70 mm film exposed at 24 fps (frames per second) full speed is about two feet per second, while at 60 fps full speed is about five feet per second. The cost of 70 mm film is about one dollar per foot, so about $10 worth of film may be wasted during a period of four seconds required to accelerate it to 60 fps. The cost can be even higher when a camera is to take pictures for "slow motion," which can require accelerating to an even greater speed. One type of prior art motion picture camera uses a "camera" motor for moving film through the film gate, and a separate "reel" motor for rotating the takeup reel, there often being only portable battery power available for powering the motors. When the takeup reel is empty, the reel motor is capable of rapidly accelerating the takeup reel, while when the takeup reel is almost full, its motor is capable of only slowly accelerating it. However, the takeup reel motor may not be accelerated at the maximum possible rate because of the need to coordinate the camera and reel motors to maintain film tension within a moderate range.

In the past, acceleration of film through the camera was controlled by the camera motor, which was accelerated from zero to full speed at a predetermined moderate acceleration rate, which was slow enough so that the reel motor could keep up with the acceleration rate even under the worst conditions (e.g., the takeup reel was almost full). While the camera motor accelerated at a fixed predetermined rate, the takeup reel motor was slaved to the camera motor. The takeup reel motor was energized at a sufficient acceleration to maintain a moderate film tension along the path between the film gate and the takeup reel. A dancer arm was used to sense film tension. Acceleration was always slow and considerable film was wasted at every startup. A camera which accelerated to full speed about as rapidly as possible under whatever conditions were present (e.g., empty or full takeup reel) would be of considerable value in reducing wastage of film.

SUMMARY OF THE INVENTION

In accordance with one embodiment of the present invention, a motion picture camera is provided which minimizes wastage of film during acceleration of film to the full operating speed. The camera includes a camera motor which moves film through the film gate region and a reel motor which turns a takeup reel to wind film thereon. The tension in film at a location between the film gate and takeup reel is sensed, and the speed of the camera motor is controlled during acceleration from zero to full speed to maintain a moderate film tension.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
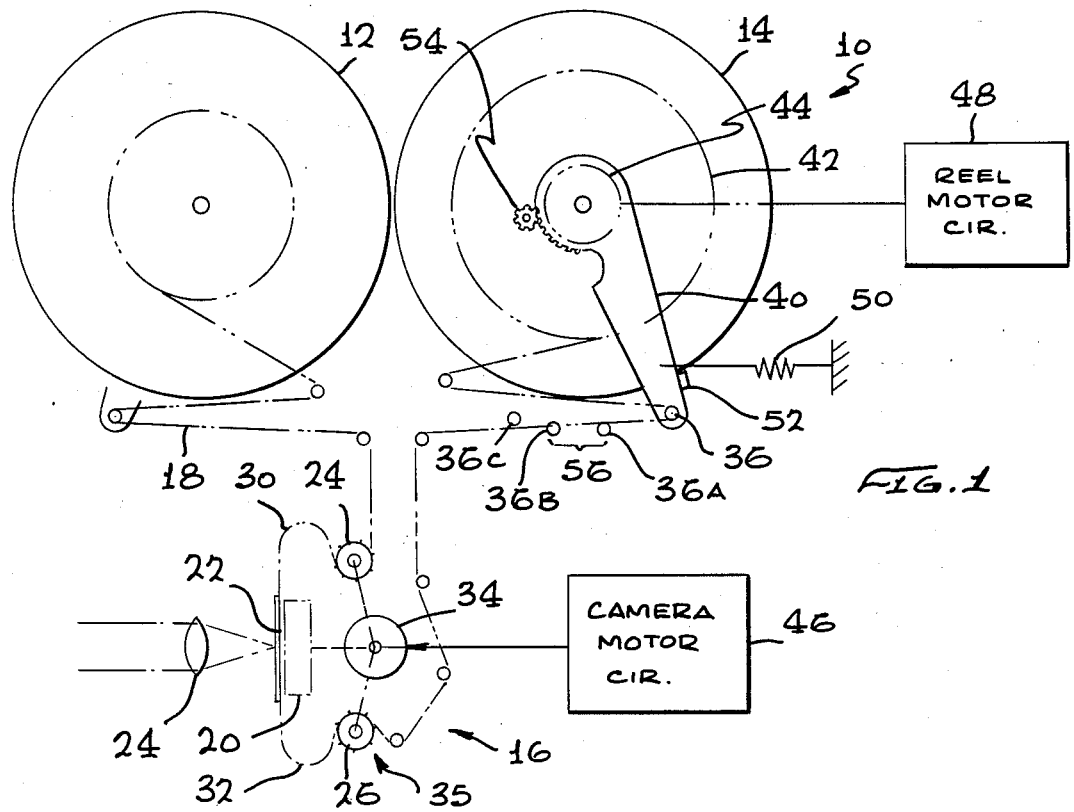
FIG. 1 is a simplified side elevation view of a motion picture camera constructed in accordance with the present invention.

FIG. 1 illustrates a motion picture camera system 10 which includes a supply reel 12, a takeup reel 14, and a camera mechanism 16. The supply and takeup reels 12, 14 are often part of a removable film cartridge, and the rest of the camera mechanism is often referred to as the "camera." The camera mechanism 16 includes an intermittent moving mechanism 20 such as a claw mechanism, which moves the film intermittently through a film gate 22, where the film momentarily stops, a shutter (not shown) is opened, and light from a scene is focused by a lens 24 onto the film. The most common motion picture cameras normally expose film at a rate of 24 fps (frames per second) (but may go considerably higher for slow motion effects), while cameras for taking pictures for a new system developed by Showscan Film Corporation usually take pictures at a rate of 60 fps.

During normal exposure of film, a pair of sprocket wheels 24, 26 respectively located at the up-path and downpath ends of the film gate region 35, move film continuously into and out of loops 30, 32 lying on opposite sides of the film gate. A camera motor 34 drives the sprockets 24, 26 and the intermittent mechanism 20 to move the film through the film gate region 35. Film from the camera mechanism 16 moves around a roller 36 on a dancer arm 40 and onto the roll of film 42 on the takeup reel 14. A reel motor 44 turns the takeup reel to wind film thereon. Camera and reel motor circuits 46, 48 energize the camera and reel motors 34, 44. The dancer arm 40 is biased by a spring indicated at 50 towards a stop 52, but tension in the film urges the arm to pivot away from the stop. The position of the dancer or tension arm can be sensed by a tension-sensing device 54 which may be a potentiometer or other device.

When a scene is to be photographed, the film 18 is held stationary until photographing is about to begin. Then the camera and reel motors 34, 44 are rapidly accelerated until the film is at a predetermined full operating speed, which is about 5 feet per second for the Showscan camera (70 mm film at 60 fps). Film is wasted during the period of a few seconds required to accelerate the film to full speed. For 70 mm film costing about $1 per foot, about $10 worth of film is wasted if it requires four seconds of constant acceleration to reach a final speed of about 5 feet per second. When the takeup reel 14 is almost empty, a moderate torque can rapidly accelerate it, while when the takeup reel becomes full, the same torque produces slow acceleration. In many camera systems, only a small battery-powered takeup motor is used, so torque is limited. However, in such cameras, the camera motor is to produce fairly rapid acceleration, even while applying film tension for accelerating the supply reel. In the prior art, the camera motor such as 34 was driven at a predetermined relatively slow acceleration from zero to full speed, and then maintained at full speed. The takeup reel motor such as 44 was "slaved" to the camera motor, so the takeup reel motor was merely turned at a rate to maintain the film tension at a moderate level at all times. That is, the reel was turned so the dancer arm such as 40 was maintained with its roller 36 in the moderate tension range indicated at 56. As a result, it always required a considerable time for the camera to accelerate from zero to full operating speed, regardless of the amount of film on the reels, and a considerable amount of film was always wasted at each camera start up. The amount of wasted film becomes greater as larger film frames and higher frame rates are used.

In accordance with the present invention, the camera motor 34 is not always driven at a predetermined constant acceleration between zero and full operating speed, and the reel motor is not merely "slaved" to the camera motor. Instead, the reel motor 44 is driven at a high acceleration rate, which varies according to the size of the roll of film 42 on the takeup reel. The camera motor 34 is driven at an acceleration rate which maintains a moderate film tension within the center range 56 of dancer arm roller movement. If the camera motor 34 has a relatively high power output compared to the reel motor 44, so the camera motor can accelerate film faster than can the reel motor even when the takeup reel is almost empty, then the takeup reel motor 44 can be driven at maximum possible acceleration at every start up. In that case, the camera motor 34 is substantially "slaved" to the takeup reel motor, in that the camera motor accelerates at a rate equal to the rate at which the takeup reel accelerates film.

To ensure that film is fed toward the takeup reel as fast as it is moved onto the takeup reel (so the film does not fall off the rollers and tear), the camera motor speed is controlled by the position of the dancer arm 40. The camera motor speed is controlled so that the dancer arm 40 remains within its middle range 56 which produces a middle range of film tension (2.25 pounds at 36B to 2.75 pounds at 36A, as compared to a minimum 2.0 pounds at 36C and 3.0 pounds at 36). In this way, when the takeup film roll 42 is very small, so the takeup reel can be accelerated very rapidly, the camera motor 34 will follow such rapid acceleration, and the film will accelerate to full speed in a minimum amount of time which causes minimum wastage of film. When the takeup roll is almost full so it can be accelerated only slowly, considerable film will be wasted, but no more than in the prior art. The savings in film during the time when the takeup reel can be rapidly accelerated constitutes a considerable cost saving.

Figure 2:
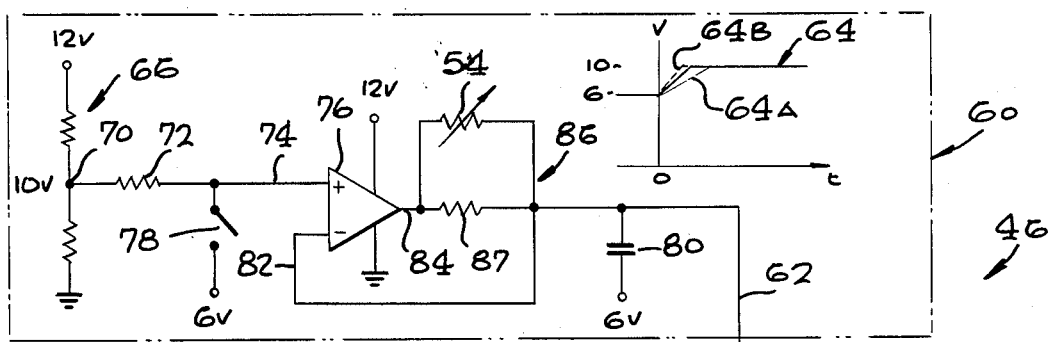
FIG. 2 is a simplified schematic diagram of the camera motor circuit.

FIG. 2 illustrates some details of the camera motor circuit 46 which controls the speed of the camera motor during acceleration to full speed and during operation at full speed. The circuit includes a reference voltage-generating circuit portion 60 which has an output line 62 that carries a voltage indicating what the speed of the camera should be at any instant. As indicated by the graph 64 which shows the reference voltage on output line 62, the voltage in this particular circuit is originally at six volts, which indicates that the camera should be at zero speed, and increases to ten volts which indicates that the camera motor should turn at full speed. A particular voltage in between these levels indicates a particular speed at any instant during acceleration.

The reference generator circuit portion 60 includes a voltage divider 66 having a contact at 70 which carries ten volts to govern the precise final speed of the motor. If a faster speed is desired to later show slow motion, a higher input voltage at 70 will be used. The contact 70 is connected through a resistor 72 to an input 74 of an operational amplifier 76. Before the motor starts, a switch 78 is closed to maintain an input at 74 of six volts, which produces a constant output at 62 of six volts, indicating zero camera motor speed.

At the beginning of a photographing sequence, the switch 78 is opened to apply ten volts to the amplifier input 74. At that instant, the output 62 is at six volts, due to a zero voltage across a capacitor 80 which is connected to a six volt source. The output 62 is fed back as a second input 82 to the operational amplifier, so that a large current flows through the output 84 of the amplifier. This current flows through a resistance 86 which includes the potentiometer 54 that is controlled by film tension as sensed by the dancer arm 40 in FIG. 1 and a parallel resistor 87. If the film is slack, or has low tension so the roller is at the position 36A, the camera motor should accelerate slowly and the potentiometer 54 will have a high resistance resulting in only a small current flow through the resistance 86 and only a small rate of increase in the voltage output 62. This is indicated by the graph 64A. On the other hand, if the film is tight, as indicated by the roller being at the position 36B in FIG. 1, then the potentiometer resistance will be low, resulting in larger current flow to more rapidly charge the capacitor 80 and resulting in a rapid increase in the reference voltage as indicated by the graph 64B.

As mentioned above, the reference voltage output on line 62 determines the speed of the camera motor. Also, the rate of change of the reference voltage on line 62 defines the acceleration rate of the film by the camera motor. Thus, the acceleration of the camera motor during start up is controlled by the tension of film between the film gate and takeup reel. If the takeup reel motor can accelerate the takeup reel rapidly to produce higher tension in the film, the camera motor will accelerate rapidly to prevent excessive film tension and cause rapid film acceleration. On the other hand, if the takeup reel is almost full so the takeup reel motor can only slowly accelerate the takeup reel, the tension in the film will be lower and the camera motor will accelerate more slowly to follow the slow acceleration of the takeup reel motor. The camera system will operate properly under all conditions to avoid extremes of film tension that could damage the film, and yet will produce rapid acceleration when the takeup reel can rapidly wind up film.

Returning again to FIG. 2, the reel motor circuit 46 also includes a camera drive circuit 90 which controls the speed of the camera motor according to the reference voltage on line 62. The reference voltage at 62 is applied to a summing junction 92 which also receives the output of a tachometer 94 plus a constant voltage of six volts applied at a point 96. When the camera motor is not turning, the output of the tachometer is zero and the voltage applied at 100 is six volts, resulting in six volts at the summing junction 92. The voltage at the summing junction 92 is applied as one input 102 of a differential power amplifier 104 whose other input 106 is at a constant six volts. The output of the power amplifier 104 is delivered through a converter circuit 108 to the camera motor 34. Applicant's camera motor 34 is a pulse width modulated 30-volt motor, and the circuit 108 converts the output of the amplifier 104 to a corresponding input for the camera motor. The tachometer 94 produces a voltage that changes from zero to −2 volts as the motor speed increases from zero to full speed, and serves as a means for providing feedback to maintain a more constant relationship between reference voltage and motor speed.

Figure 3:
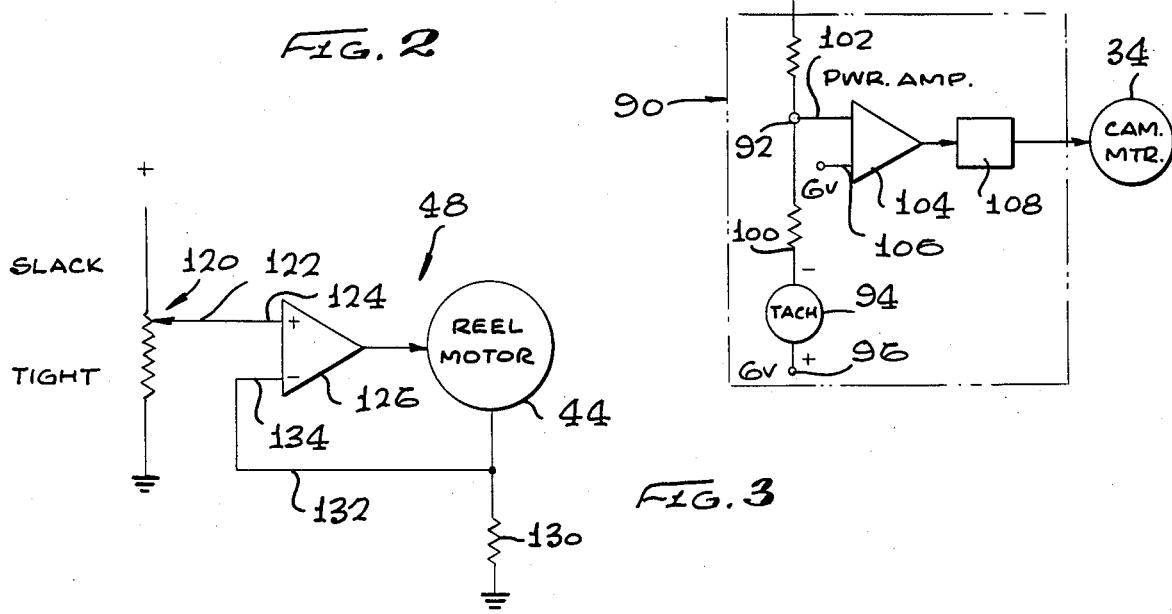
FIG. 3 is a simplified schematic view of a reel motor circuit.

If the camera motor has sufficient power to keep on with the acceleration of the takeup reel motor even when the takeup reel is almost empty, then it is only necessary to drive the takeup reel motor at maximum acceleration until the camera motor is operating at full speed. If the takeup reel motor is powerful enough to accelerate the wind up of film faster than the camera motor can keep up with it, then it is necessary that the acceleration of the takeup motor be limited by film tension. In any case, the takeup reel motor should accelerate at a rapid rate until film is moving at full speed through the film gate, at which time the reel motor should be "slaved" to the camera motor to wind up film as fast as it passes at full speed through the film gate. FIG. 3 is a simplified schematic diagram of the reel motor circuit 48. The circuit 48 includes a potentiometer 120 with a contact 122 whose voltage depends upon the film tension. The potentiometer 120 can be connected to the dancer arm in the same manner as the potentiometer 54 in FIG. 1. The output of the potentiometer contact 122 is delivered as one input 124 of a differential amplifier 126. The differential amplifier 126 drives the reel motor 44. The current through the reel motor 44, which is proportional to the torque produced by the reel motor, passes through a sensing resistor 130. A feedback line 132 senses the current, and therefore the output torque of the reel motor to supply a second output 134 of the differential amplifier 126. If the film tension is constant and within the mid-range, so the amplifier input 124 is substantially constant, then the amplifier output is controlled by the output torque of the motor. The feedback resistor 130 is chosen so that the reel motor initially applies a very high torque, with the torque limited so the reel motor does not damage itself or the takeup reel mechanism. As long as the camera is at less than full speed so its acceleration is highly sensitive to film tension, the takeup reel motor can accelerate at a rapid rate. When the camera motor reaches full speed so that its speed is insensitive to film tension, with the takeup reel continuing to accelerate for a very short time, film tension will rise and the potentiometer contact 122 will move down to produce a smaller voltage input to the amplifier input 124. This results in a reduced reel motor torque, which will be reduced to a level required to turn the takeup reel at whatever substantially constant speed is required to maintain film tension within the middle range. Therefore, while the circuitry permits the reel motor to rapidly accelerate when the film is moving at less than full speed at the film gate, the circuitry automatically ceases camera motor acceleration when full speed is reached and then automatically stops takeup reel acceleration, all in an automatic smooth adaption.

Thus, the camera minimizes wastage of film during acceleration of film through the film gate from zero to operating speed by producing rapid acceleration of the film, generally to the extent that the takeup reel is able to rapidly accelerate. This is accomplished by driving the camera motor so that it is largely slaved to the takeup reel motor prior to achievement of full speed, and only then slaving the takeup reel motor to the camera motor.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a motion picture camera which includes a camera motor that supplies substantially all power for driving a mechanism that moves film through a film gate region at full operating speed, a reel motor that can turn a reel in a direction to wind film thereon, and tension sensing means for sensing the tension of film at a tension sensing location between the film gate region and reel, the improvement comprising:

a camera motor circuit coupled to said camera motor to energize it to turn at any speed within a range from zero to a predetermined full operating speed, said camera motor circuit including means responsive to said tension sensing means during acceleration of film between zero and full operating speed for controlling camera motor acceleration to maintain film tension at said tension sensing location substantially within predetermined limits, said camera motor circuit controlling said camera motor to maintain said full operating speed when said full operating speed is reached;

a reel motor circuit coupled to said reel motor to accelerate it at a maximum acceleration during a period before said camera attains full operating speed, said reel motor circuit including means responsive to film tension at said tension sensing location for maintaining a level of reel motor output torque in a direction to wind up film which results in maintaining film tension at said location between predetermined limits after said camera motor is at full operating speed;

said camera motor being slaved to said reel motor during said period before said camera motor attains full operating speed, by the fact that the camera motor speed is controlled to maintain film tension between predetermined limits as the reel motor accelerates;

said reel motor being slaved to said camera motor after said camera motor is at full operating speed, by the fact that the reel motor speed is controlled to maintain film tension between predetermined limits as the camera motor moves film to said tension sensing location.

2. In a motion picture camera which includes a camera motor for driving a mechanism that moves film through a film gate region, a reel motor that can turn a reel in a direction to wind film thereon, and tension sensing means for sensing the tension of film at a location between the film gate region and reel, the improvement comprising:

a camera motor circuit coupled to said camera motor to energize it to turn at any speed within a range from zero to a predetermined full operating speed, said camera motor circuit including means responsive to said tension sensing means during acceleration of film between zero and full operating speed for controlling camera motor acceleration to maintain film tension at said location substantially within predetermined limits;

said camera motor circuit includes a voltage reference circuit portion which includes a voltage source which generates a preset constant voltage, a differential amplifier having a first input coupled to said voltage source, a second input, and an output, said reference circuit portion also including a capacitor, a variable resistance controlled by said tension sensing means and coupling said amplifier output to said capacitor, the capacitor also coupled to said second input of said differential amplifier, so the rate of increase of the capacitor voltage is dependent upon said variable resistance controlled by said tension sensing means, until the voltage at the second input equals said preset constant voltage;

means responsive to the capacitor voltage for controlling the speed of the camera motor, whereby to control camera motor acceleration by film tension until full operating speed is reached, and then to maintain full operating speed.

* * * * *